United States Patent
Ronström (10) Patent No.: US 7,945,538 B2
(45) Date of Patent: May 17, 2011

(54) METHOD AND ARRANGEMENTS FOR NODE RECOVERY

(75) Inventor: Mikael Ronström, Hägersten (SE)

(73) Assignee: Oracle America, Inc., Redwood City, CA (US)

( * ) Notice: Subject to any disclaimer, the term of this patent is extended or adjusted under 35 U.S.C. 154(b) by 1898 days.

(21) Appl. No.: 10/471,822

(22) PCT Filed: Mar. 13, 2001

(86) PCT No.: PCT/SE01/00520
§ 371 (c)(1),
(2), (4) Date: Sep. 15, 2003

(87) PCT Pub. No.: WO02/073409
PCT Pub. Date: Sep. 19, 2002

(65) Prior Publication Data
US 2004/0107198 A1 Jun. 3, 2004

(51) Int. Cl.
*G06F 7/00* (2006.01)
*G06F 17/00* (2006.01)
*G06F 17/30* (2006.01)
*G06F 11/00* (2006.01)

(52) U.S. Cl. ....... 707/683; 707/684; 707/767; 714/6.21; 714/16; 714/19

(58) Field of Classification Search ...... 707/1, 201–203, 707/8, 683, 684, 767; 714/19, 6, 6.32, 16
See application file for complete search history.

(56) References Cited

U.S. PATENT DOCUMENTS

| 5,278,982 A | * | 1/1994 | Daniels et al. ................ 707/202 |
| 5,423,037 A | * | 6/1995 | Hvasshovd ................... 707/202 |
| 5,555,404 A | | 9/1996 | Torbjornsen et al. |

(Continued)

FOREIGN PATENT DOCUMENTS

EP 0 501 180 9/1992

(Continued)

OTHER PUBLICATIONS

"Crash Recovery in NDB Cluster, a Parallel Data Server for Telecom Applications", By Mikael Ronstrom, Published 1999.*

(Continued)

*Primary Examiner* — Apu M Mofiz
*Assistant Examiner* — Chelcie Daye
(74) *Attorney, Agent, or Firm* — Marsh Fischmann & Breyfogle LLP; Kent A. Lembke; Jeffrey C. Maynard (57) ABSTRACT

The present invention relates to a method and arrangements for node recovery particularly suitable for recovery involving large database fragments. The method for node recovery according to the present invention makes use of an old version of a fragment in a failed node (114). The old version is brought up to date by means of scanning an up to date version of the fragment in another node and copying parts of the fragment (117), which have changed since the creation of the old version, to the recovering node. A delete log is utilized in order to take deletions, which have taken place since the creation of the old version, into account in the recovery of the failed node (116). An advantage of the method for node recovery according to the present invention is that it does not require write transactions to be stopped during the recovery process.

20 Claims, 4 Drawing Sheets

U.S. PATENT DOCUMENTS

| | | | |
|---|---|---|---|
| 5,613,113 A | | 3/1997 | Goldring |
| 5,729,735 A | | 3/1998 | Meyering |
| 5,758,356 A | * | 5/1998 | Hara et al. .................. 707/202 |
| 5,764,877 A | * | 6/1998 | Lomet et al. ..................... 714/6 |
| 5,778,387 A | * | 7/1998 | Wilkerson et al. ........... 707/202 |
| 5,974,425 A | | 10/1999 | Obermarck et al. |
| 6,032,158 A | * | 2/2000 | Mukhopadhyay et al. ... 707/201 |
| 6,078,930 A | * | 6/2000 | Lee et al. ..................... 707/202 |
| 6,449,623 B1 | * | 9/2002 | Bohannon et al. ............ 707/202 |
| 6,594,781 B1 | * | 7/2003 | Komasaka et al. ............. 714/19 |

FOREIGN PATENT DOCUMENTS

| | | |
|---|---|---|
| EP | 0 758 114 | 2/1997 |
| EP | 0 794 646 | 9/1997 |
| EP | 0797 806 | 10/1997 |

OTHER PUBLICATIONS

"Crash Recovery in NDB Cluster, a Parallel Data Server for Telecom Applications", by: Mikael Ronstrom, published Dec. 8, 1999.*

Publication No. JP 07244597 A("Method for Forming Consistency Group to Provide Disaster Recovery Function, and Its Related System").

Publication No. JP 08286964 ("Method of Processing Distributed Transaction").

Publication No. 09204337 ("Data Base Management System").

Publication No. 11327991 ("Hot Spare System and Data Base Management System").

Agrawal et al., "Integrated Concurrency Control and Recovery Mechanisms: Design and Performance Evaluation", ACM Transactions on Database Systems, vol. 10, No. 4, Dec. 1985, pp. 529-564.

Ronstrom et al., "Node Recovery in NDB Cluster, a Parallel Data Server for Telecom Applications", Dec. 29, 1999.

Ronstrom et al., "Reliability Solutions for a Telecom Database", Oct. 14, 1999.

Ronstrom et al., Crash Recovery in NDB Cluster, A Parallel Data Server for Telecom Applications, Dec. 8, 1999.

* cited by examiner

| TS | ID | DATA |
|---|---|---|
| 2 | R1 | 8 |
| 7 | R2 | 8 |
| 6 | R10 | 7 |
| 5 | R4 | 10 |
| 6 | R5 | 19 |
| 2 | R7 | 3 |
| 7 | R8 | 11 |
| 6 | R11 | 1 |
| 6 | R12 | 0 |
| 8 | R13 | 5 |

| TS | ID |
|---|---|
| 6 | R8 |
| 7 | R3 |
| 8 | R6 |
| 8 | R9 |

METHOD AND ARRANGEMENTS FOR NODE RECOVERY

This application is the U.S. national phase of international application PCT/SE01/00520, filed Mar. 13, 2001, which designated the U.S.

FIELD OF THE INVENTION

The present invention relates to handling of a system with a distributed database in general and to recovery of a node in such a system in particular.

BACKGROUND OF THE INVENTION

A database is made up of one or several tables of data. The table may be subdivided into fragments. The fragments are made up of records (also called tuples). In a parallel system the fragments may be stored in a number of different nodes that communicate over a local network. The nodes are managed by a centralized management system. A common way to protect the system from loosing data when a node fails is to make replicas of each fragment in the system and store one replica in one node as a primary replica and at least one other replica in at least one other node as backup. By keeping backup copies of data the system may continue to function even when a node fails and a primary copy of data or a backup copy is lost. This is possible since the data that is lost through the failure also is contained in other nodes in the system.

After a node failure, it is desirable to recover the node by rebuilding the fragment or fragments that the node contained before the failure. An important part of the recovery is to make sure that the fragments of the recovered node are up to date. Transactions such as updates, inserts and deletes will have taken place while the node was down. Transactions are often also allowed to continue during the recovery process. It is necessary to take all such transactions into account in the rebuilding of the fragments. If a transaction, which was performed during the node failure or while the recovery was in progress, is missed, the recovered node will not be up to date.

There are several known methods for performing node recovery. One such method is the so-called "copy method". The copy method is simple and straightforward. By holding replicas of all data on different nodes in the system, the data to be recovered will exist on a node other than the failed node. A new fragment is built from scratch on the recovering node by copying the corresponding fragment from the other node on which the fragment exists. One way of performing the copying is to copy and transfer one record at a time to the recovering node. If all write transactions are stopped during the recovery the new fragment will be an up to date version when all records are copied from the existing fragment. If write transactions are allowed during the recovery, arrangements must be made so that both the node holding the existing fragment and the recovering node receives the requested write transaction. In order to avoid inconsistencies the record is locked so that no write transactions may be performed on it while it is being copied and transferred to the recovering node. If the above is performed in a careful manner the recovered node will be up to date when all records are copied and transferred, without stopping write transactions during the recovery.

Another known method of performing node recovery is a method in which log records are executed. In this method, the nodes keep logs in which the log records are stored. The log records contain information regarding how corresponding transactions, such as inserts, deletes or updates, have changed the database fragments. When a node fails, log records corresponding to transactions made to the fragments of the failed node, are stored in a log in at least one other functioning node, at least from the time the node failed until it has recovered. There are many different ways in which to generate log records. In order to be able to use the log records in the node recovery process it must be possible for log records generated at a node that is alive to execute on the recovering node. Instead of rebuilding the lost fragment from scratch as in the copy method, it is assumed in this method that an old version of the fragment is available in the recovering node. The old version of the fragment may for instance be a version that was stored on disk before the node failure. The old version of the fragment may lack a number of records that have been inserted during the node failure. Further, it may still contain records that have been deleted, and it may contain a number of records that are out of date since they have been updated while the recovering node was down. Owing to the fact that logs are kept of all transactions made, there will be an active node, which contains the log records of the transactions that have been performed since the node failed. These log records will bring the recovering node up to date if they are executed on the recovering node and if no write transactions are allowed during the recovery process.

To disallow write transactions during the recovery process is highly undesirable. The method can be made more attractive by allowing write transactions, such as insert, delete and update, during the recovery process, but this will increase the complexity of the method. After the log records that correspond to transactions being made from the time the recovering node failed until the recovery process started have been executed on the recovering node, transactions that have been performed from the recovery process started until a first point in time are executed. Thereafter another iteration may be made in which log records, which were generated from the first point in time until a second point in time, are executed. The process may continue with several iterations and each iteration will hopefully bring the fragment of the recovering node closer to the real version of the fragment. It is however hard for the recovering node to catch up with the real version without stopping write transactions at least for a short time.

R. Agrawal and D. Dewitt, "Integrated Concurrency Control and Recovery Mechanisms: Design and Performance Evaluation", ACM Transactions on Database systems, Vol. 10, No. 4, Dec. 1985, pages 529-564, describes three basic recovery mechanisms using logs, shadows or differential files respectively. The recovery mechanism using logs corresponds to the log method described above and the recovery mechanism using shadows corresponds to the copy method described above. The use of differential files involves keeping a local differential file and a global differential file for storing updates. Before a transaction is committed its updates go to the local differential file. When the transaction commits the local differential file is appended to the global differential file and a timestamp of the committing transaction is written to a CommitList. In case of a recovery only transactions with timestamps that appear in the CommitList are taken into account.

The European patent application EP0758114A1 describes recovery processing using log records in a system in which a plurality of servers cooperatively perform distributed processing of transactions.

The known methods for node recovery described above suffer from a number of drawbacks. With the copy method, the time for recovery grows with the size of the fragments to be recovered. Thus the copy method may become too slow when the fragments to be recovered are very large. With the method using log records it will most likely be necessary to stop write transactions for at least a short time, which is highly undesirable. If write transactions are allowed during the recovery process, new log records will be generated while old log records are being executed.

Handling this increases the complexity of the method. Another drawback of the method using log records is that the log may grow very large if the period between node failure and recovery is long. If the maximum size of the log is reached, the log will not be able to store any new log records, which leads to that write transactions will have to be stopped.

SUMMARY OF THE INVENTION

The problem to be solved by the present invention is to provide a method and arrangements for node recovery that does not suffer from the drawbacks of the presently known methods of node recovery described above.

An object of the present invention is thus to provide a method and arrangements for node recovery, which are suitable for node recovery involving large fragments and which do not require write transactions to be stopped during the recovery process.

The object of the present invention is achieved by means of a method as stated in claim 1, a node as stated in claim 11 and a system as stated in claim 21.

The present invention solves the problem mentioned above by means of a method of node recovery that makes use of an old version of a fragment in a failed node. The old version is brought up to date by means of scanning an up to date version of the fragment and copying parts of the fragment, which have changed since the creation of the old version, to the recovering node. A delete log is utilized in order to take deletions, which have taken place since the creation of the old version, into account in the recovery of the failed node.

The above stated problem is, according to the invention, also solved by means of a node and system particularly arranged for carrying out the inventive method of node recovery.

According to the inventive method all records in the database are time-stamped. Another characteristic feature of the inventive method is that log records holding information regarding deletes are stored in a delete log. The inventive method is based on the assumption that an old version of a fragment of a failed node is somehow available when the node is to be recovered. The old version may for instance be obtainable from disk in the recovering node. According to the inventive method the recovering node is made available to all new transactions that occur from the time the recovery starts. The new transactions are performed on the old version of the fragment where applicable. Log records from the delete log are executed on the recovering node in order to remove already deleted records from the old version of the fragment. Thereafter the up to date version of the fragment is scanned and the timestamp of each record in the up to date version is checked to see if the timestamp is indicating a point in time later than or equal to a predetermined point in time. If this is the case the record is copied to the old version of the fragment. When the scanning is completed and the appropriate records are copied, the old version of the fragment has been brought up to date.

An advantage of the present invention is that it makes it possible to perform node recovery without stopping write transactions, not even for a short moment. It is naturally of interest to accomplish a database system that is as robust as possible. However node failures will always occur and precautions must therefore be made to make the impact of such events as little as possible on the system as a whole. If write transactions can continue throughout the node recovery process the normal function of the system as a whole can continue without disturbances even when a node failure occurs.

Another advantage with the present invention is that it provides node recovery that is well suited for recovery of large fragments of data. As mentioned above recovery by means of the known methods of node recovery could become unacceptably slow for large fragments. The present invention provides for node recovery that is fast also when the fragments to be recovered are very large.

Yet another advantage with the present invention is that the only transactions that are logged according to the invention are delete transactions. The information that needs to be stored about a delete transaction is very small (<100 bytes) and there is therefore little risk for overflow in the delete log. As mentioned above a problem with the known method that uses log records is that the log may become full so that write transactions need to be stopped. The present invention decreases the risk for this since only some write transactions are logged and the log records for those write transactions are small. The memory space that needs to be reserved for the delete log of the present invention is thus small.

A further advantage of the present invention is that it provides for fast and efficient node recovery, which also is simple and straightforward. The implementation of a method for node recovery in a system can be very expensive. The simpler the method of node recovery is, the easier it is to implement and the lower the cost for implementation.

The invention will now be described with the aid of preferred embodiments and with reference to accompanying drawings.

DETAILED DESCRIPTION OF SPECIFIC EMBODIMENTS

Figure 1:
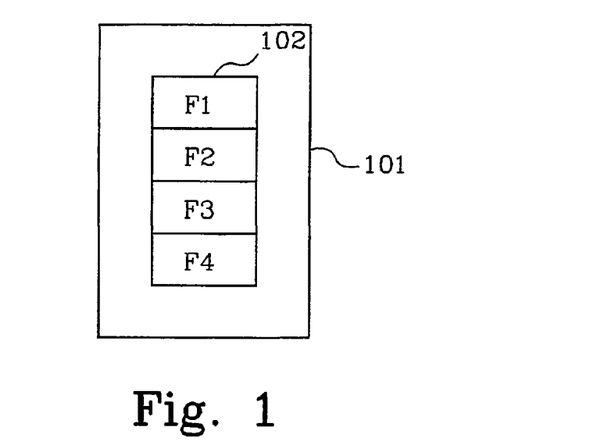
FIG. 1 shows a block schedule over a database.

FIG. 1 shows a diagram of a database 101, which includes a table 102 of data. The table 102 comprises a large number of records (not shown). If the database 101 is stored in a parallel system the table 102 may be physically stored in a number of different nodes. The table is then subdivided in a number of different fragments that may contain varying numbers of records. The fragments are then stored on the different nodes. The table 102 of FIG. 2 is shown to include four fragments F1, F2, F3 and F4.

Figure 2:
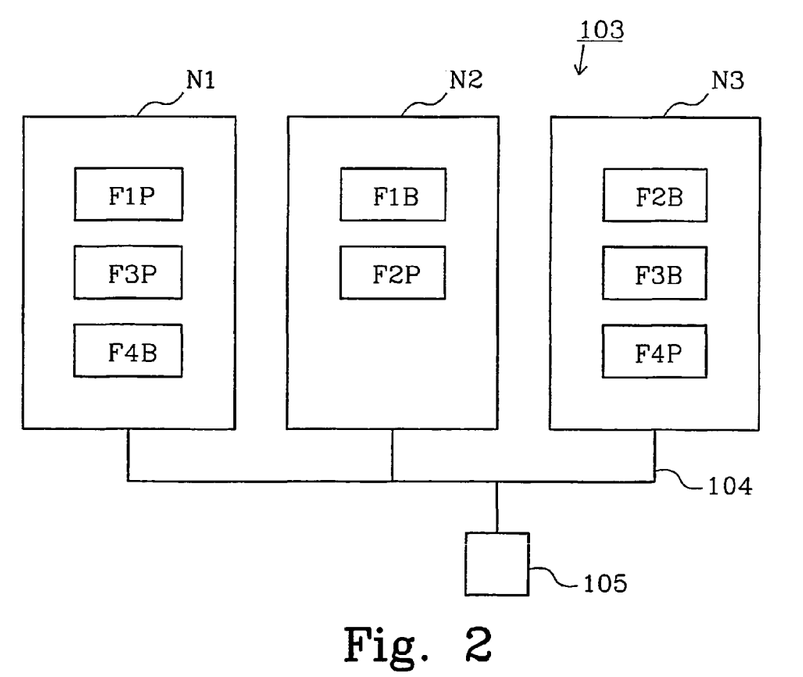
FIG. 2 shows a block schedule over a parallel system with a database distributed between several nodes.

FIG. 2 illustrates how the fragments of the table 102 are spread out between nodes N1, N2, N3 in a parallel system 103. The nodes N1, N2, N3 are interconnected by means of a local network 104 and are managed by a centralized management system 105. In order to increase the robustness of the system 103 the fragments F1, F2, F3, F4 are duplicated such that for each fragment a primary version and a backup version exist, which are stored on two separate nodes. Thus it is possible for the system to loose one node without loosing any data. In FIG. 2, the node N1 holds a primary version F1P of the fragment F1, a primary version F3P of the fragment F3 and a backup version F4B of the fragment F4. The node N2 holds a backup version F1B of the fragment F1 and a primary version F2P of the fragment F2. The node N3 holds a backup version F2B of the fragment F2, a backup version F3B of the fragment F3 and a primary version F4P of the fragment F4.

Figure 3:
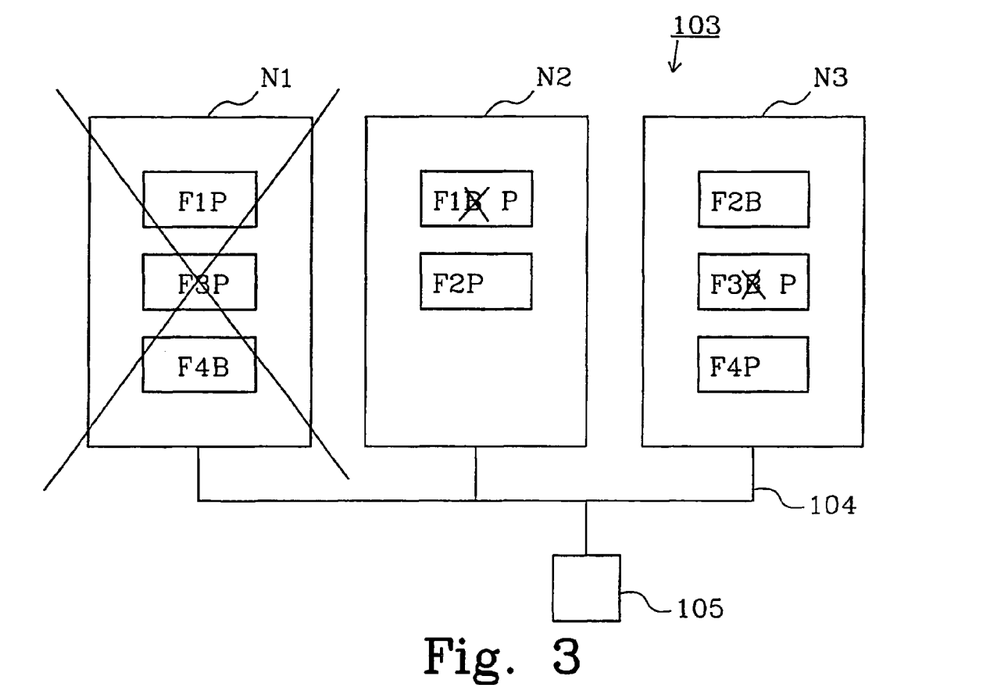
FIG. 3 shows a block schedule over the parallel system of FIG. 2 with one failed node.

If the node N1 fails as illustrated in FIG. 3, the primary versions F1P, F3P of the fragments F1 and F4 are lost, as well as the backup version F4B of the fragment F4. This will cause the backup version F1B in the node N2 and the backup version F3B in the node N3 to become primary versions, which is illustrated in FIG. 3.

After the failure of the node N1 it is desirable to recover it and restore the fragments on the node N1 that was lost. The present invention provides a method and arrangements for performing such a node recovery.

According to the present invention, all records in the fragments are marked with a timestamp. The timestamp is an attribute that indicates when the last write transaction that affected the record was performed.

Figure 4:
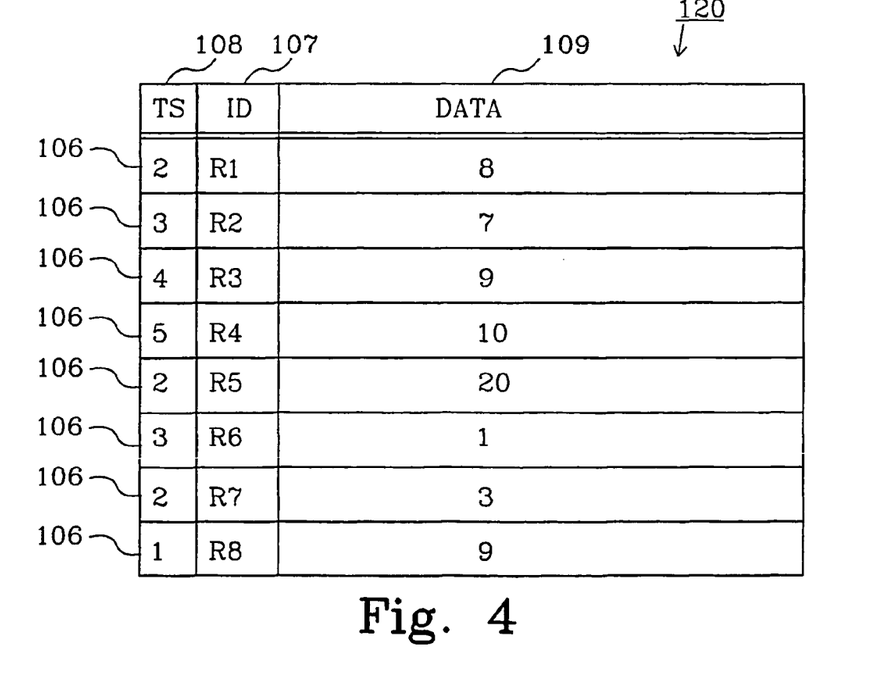
FIG. 4 shows a block schedule over a view of a database fragment at a first point in time.

FIG. 4 shows a simplified diagram of a possible appearance of a version 120 of the fragment F1. The version 120 of the fragment F1 is shown to include eight records 106. The number of records may in reality be very much larger, but a small and simple representation of the fragment F1 is illustrated in order to give a clear and simple presentation of the ideas behind the present invention. Each record includes a unique identifier (ID) 107, a timestamp (TS) 108, as mentioned above, and a piece of data 109. The timestamps 108 will preferably be a numeric discrete representation of the time with some predetermined level of accuracy. In this simplified example we assume that time for the purpose of timestamping is measured in integers and that the system was initialized at time 1, such that transactions performed immediately after initialization give rise to timestamps with value 1 and transactions performed a time interval later (i.e. at time 2) give rise to timestamps with value 2 etc.

The write transactions that cause the records to be marked with a new timestamp are of three different types: deletes, inserts and updates. When a delete is performed a specified record is deleted from the fragment. The timestamp for the delete transaction and the identifier of the deleted record is however, according to the invention, stored in a special delete log as will be explained further below. An insert is when a new record is added to the fragment and an update is when the data 109 of a specified record 106 is updated with new data, for instance by means of adding a specified number to the present data of the specified record.

From the illustration of the fragment F1 in FIG. 4, it can for instance be seen that the record with identifier R8 was inserted, or last updated, at time 1. The record 106 that was updated or inserted last in the fragment F1 is the record with identifier R4 since it is the record that is marked with the timestamp 107 with the highest value, which is 5.

Figure 5:
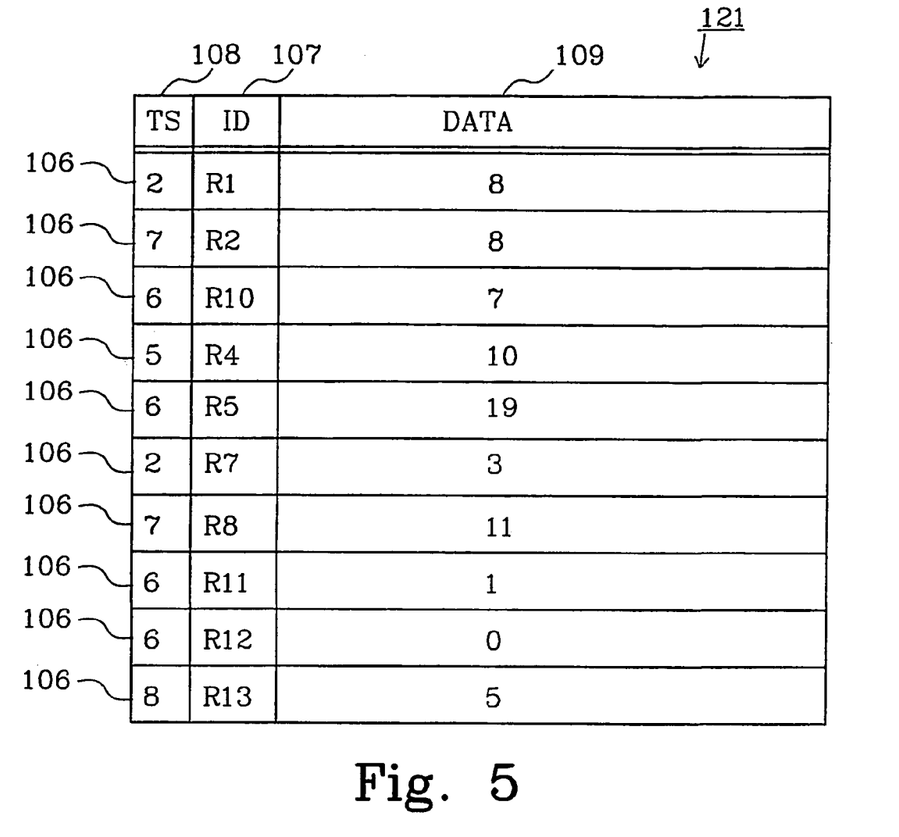
FIG. 5 shows a block schedule over a view of the database fragment in FIG. 4 at a second point in time.

Now, let us assume that the node N1 failed at time 6. The node N1 is then to be recovered a few time intervals later, at time 9, according to the method of the present invention. The method of the present invention is based on an old version of the fragments, which are to be restored on the node N1, being somehow available in the node N1 when the node recovery starts. The old version may for instance be obtained from disc in the node N1. In this example we assume that the old version of the fragment F1 that is available when the node recovery starts is the version 120 of the fragment F1 shown in FIG. 4. The version 120 was saved to disc at time 5. The appearance of the up to date version 121 of the fragment F1 at time 9 is the primary version F1P (former back up version F1B, see FIG. 3) in node N2, which at time 9 has the appearance as shown in FIG. 5.

The write transactions, which was performed from the time the old version 120 was saved until the time the recovery starts (from time 5 to time 9) and which has been missed in the old version 120 of fragment F1 in the recovering node N1 are shown below in table 1:

TABLE 1

|  | Type | Record ID | Data |
|---|---|---|---|
| At time 6: | insert | R9 | 3 |
|  | insert | R10 | 7 |
|  | update | R5 | old data − 1 |
|  | insert | R11 | 1 |
|  | insert | R12 | 0 |
|  | delete | R8 |  |
| At time 7: | delete | R3 |  |
|  | insert | R8 | 11 |
|  | update | R2 | old data + 1 |
| At time 8: | insert | R13 | 5 |
|  | delete | R6 |  |
|  | delete | R9 |  |

It is now desirable to restore the fragment F1 in the recovering node N1, by bringing the old version 120 up to date. According to the invention this is performed by using the up to date version 121 in node N2 to modify the old version 120 and at the same time, during the time of the node recovery, allow new write transactions to be performed.

Figure 6:
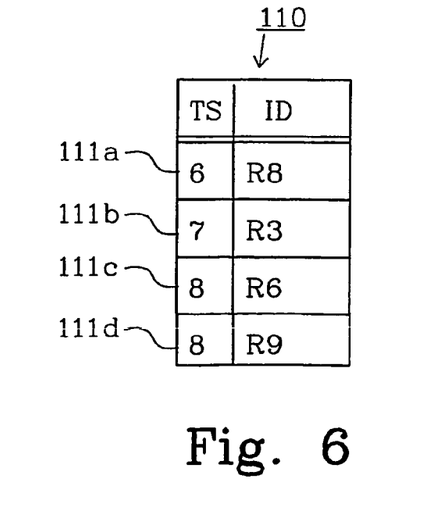
FIG. 6 shows a block schedule over a delete log according to the present invention.

As mentioned above the invention makes use of a delete log. The delete log is used in the node recovery to perform deletions on the old version, which deletions have been missed in the old version due to the failure of the node N1. The delete log may be node specific or may be centrally stored for instance in the centralized management system. At least one version of a delete log is kept for each fragment and the delete log contains logs relating to deletions that have taken place for the fragment. Each log comprises the timestamp 108 for the relevant delete transaction and the identifier 107 of the deleted record 106. It is important that all deletions, which have taken place from the time that the available old version was last updated until the node recovery starts, are logged in the delete log. FIG. 6 shows a block diagram of a delete log that contains logs for the deletions that have taken place in fragment F1 from time 5 to time 9, as shown in Table 1. The delete log 110 contains logs 111a-d that correspond to the deletions stated in Table 1. When the recovery of node N1 starts the logs from the delete log 110 are executed on the old version 120 of fragment F1 in the node N1. This causes the records with identifiers R8, R3 and R6 to be deleted from the old version 120. The log 111d can not be executed since the old version does not contain any record 106 with identifier R9. Thus the log 111d is ignored. The delete log 110 is shown to only include deletions that took place from time 5 to time 9. It is however possible that the delete log contains logs for deletions that took place before time 5 and after time 9. Such deletions are ignored by means of checking the timestamp of the log before it is executed. Logs with timestamps smaller than the timestamp with the highest value in the old version 120 are ignored, as well as logs with timestamps larger than the time that the recovery started.

After the relevant logs in the delete log 110 has been executed on the old version 120, the up to date version 121 is scanned in order to find records with timestamps that are equal to or greater than the value of the last timestamp in the old version 120 when the recovery starts, i.e. equal to or greater than 5. When a record with a timestamp equal to or greater than 5 is found in the up to date version 121 the record is copied to the old version 120. If the old version 120 already contained a record with the same identifier as the copied record, the record in the old version 120 is overwritten with the copy from the up to date version, which is transferred from the node N2 to the node N1 over the network 104. If the old version 120 did not contain a record with the same identifier as the copied record the copied record is inserted in the old version 120. The result of the scanning and copying in this example is explained in detail in what follows.

We assume that the scanning is performed from the top of the old version 121 as shown in FIG. 5. The first record with a timestamp equal to or greater than 5 that is found in the scanning process is the record with identifier R2. This record is copied from the up to date version to the old version where the old version of the record with identifier R2 is overwritten. The next record that is found in the scanning process is the record with identifier R10. The old version 120 does not contain any record with the identifier R10 so the copying of the record from the up to date version to the old version corresponds to an insert in the old version 120. The record with identifier R4 in the up to date version 121 is identical with the corresponding record in the old version. In this embodiment it is assumed that write transactions could have taken place after the old version 120 was saved but still within the time interval for which timestamps are given the value 5. Thus the record with identifier R4 is copied to the old version as a precaution. However if the old version was saved in a manner such that it was certain that all transactions at time 5 had been taken into account, the record with identifier R4 would not have had to be copied and the scanning process could have been modified to only scan for timestamps greater than 5. The next records to be found in the scanning process and copied to the old version are the records with identifiers R5, R8, R11, R12 and R13, respectively. Note that the copying of the record with identifier R8 will correspond to an insert in the old version 120 since the record with identifier R8 was deleted from the old version 120 when the log 111a of the delete log 110 was executed.

When the scanning of the up to date version is completed and all relevant records have been copied to the old version the old version will be up to date, which means that the old version has been modified such that it is identical with the up to date version. When analogous recoveries have been performed for the other fragments F3, F4, the recovery of the node N1 is completed and the node N1 contains up to date versions of the fragments F1, F3, F4. The versions of the fragments F1 and F3 can again be turned into primary versions so that the state of the system is returned to the state it was in before the failure of the node N1, as shown in FIG. 2. When the versions of the fragments F1 and F3 in node N1 are made primary versions, the versions of the same fragments in node N2 and node N3 are again made into back up versions.

If the node N2 or the node N3 would fail they could of course be recovered in a way corresponding to the description above of how the node N1 was recovered according to the present invention.

During the inventive node recovery write transactions are allowed to continue. But in order for the old version to converge to the up to date version it is necessary to let the old version take part in all write transactions that occur after the start of the node recovery. The start of the node recovery is defined as the time from which new write transactions are performed on the old version as well as on the up to date version. In the example described above the fact that write transactions may take place during the node recovery was ignored. However, if write transactions occur during the time that delete logs are being executed or the scanning process is in progress such write transactions are carried out in normal way in the up to date version and where applicable in the old version. Carrying out the write transactions in the old version where applicable implies the following. All inserts are carried out in the old version. A delete is carried out if the record that is to be deleted exist in the old version, otherwise the delete is ignored. An update is performed in the old version if the old version has a record with an identifier that equals the identifier specifying the record to be updated in the update transaction, otherwise the update is ignored. It is with this arrangement possible that the update transaction is performed on an old version of the record to be updated. This will however only happen for records that are to be overwritten in the scanning and copying process, but which have not been overwritten yet. Once the scanning and copying process reaches this record an erroneously updated piece of data is overwritten with a correctly updated piece of data from the up to date version 121. The fact that some records may be updated with erroneous data in the old version is not a problem since this data is corrected before the old version is made into a primary version. All read transactions in the database are always performed on the primary versions so there is no risk that erroneously updated data in the old version is read.

During the time that a record is copied and sent to the recovering node it is important that the record is locked so that no write transactions are performed during the copying process. The lock can be released as soon as the copying process for the record is completed.

Figure 7:
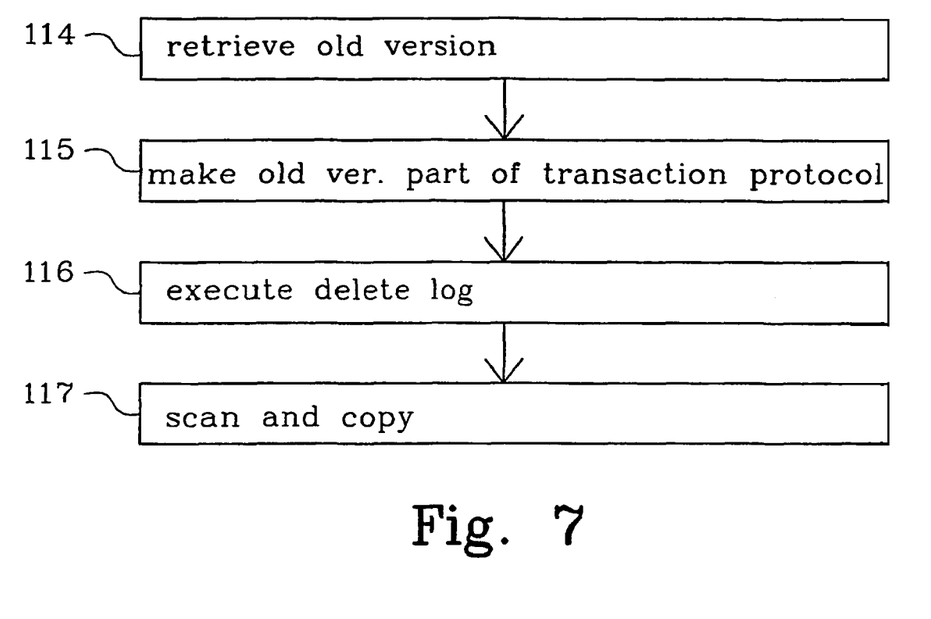
FIG. 7 shows a flow chart over an embodiment of the method for node recovery according to the present invention.

The inventive method for node recovery can in summary be illustrated by means of a flow diagram as shown in FIG. 7. In a step 114 the old version of the fragment to be recovered is retrieved. The old version is then made part of the transaction protocol in use so that the old version is made available to all new write transactions, step 115. Thereafter logs in the delete log for the fragment to be recovered are executed on the old version as described above, step 116. The recovery process is completed by means of scanning the up to date version and copying relevant records to the old version as described above, step 117.

The adjustments of the nodes N1, N2, N3, which are necessary in order to be able to perform the inventive recovery method in the system 103, will preferably be performed by modifying software in the nodes and possibly also in the centralized management system. The nodes N1, N2, N3 must be provided with means for marking the records with timestamps, means for performing real time transactions on the old version where applicable, means for executing the log records of the delete log on the old version 120, means for scanning the up to date version 121 as described above and means for copying the records found in the scanning process from the up to date version 121 to the old version 120. All these means can be implemented as software means in the nodes N1, N2, N3.

From the description above some alternative embodiments of the present invention have become clear. Further variations and modifications are possible and some other alternative embodiments will be described below.

The database 101 described above is record oriented and according to the present invention each record is timestamped. Records may vary in size, even though the records 106 shown in FIG. 4 and FIG. 5 were illustrated to only include small numbers as their pieces of data, records may in practice comprise many bytes of data each.

A database can be page oriented in stead of record oriented. Pages have a predetermined size, for instance 8 kB. The present invention is also applicable to page oriented databases. If the database is page oriented each page is timestamped instead of each record and pages are copied instead of records in the inventive method. When the term "record" is used in the description and in the claims it is intended to cover both pages and records where appropriate.

If a record contains a part of data, which is much larger than the rest of the record, it is possible, in the inventive method of node recovery, to mark this part with a timestamp of its own. Thus unnecessary copying of very large parts of data can be avoided.

The present invention may make use of a node specific delete log or a centralized delete log. In a so-called "share-nothing system" each node would typically keep a delete log for each of its fragments. Thus several delete logs for each fragment will exist in the system due to the duplication of fragments. However in another type of system a single version of the delete log for each fragment could be stored centrally, for instance in the centralized management system.

How logs are entered or deleted from the delete log may vary. As long as measures are taken so that all deletions that has been missed in the old version before the start of the recovery are logged the algorithm used for logging deletions may be of many different types.

It is further possible to produce the timestamp used according to the present invention in many different ways and the real-time interval that corresponds to a timestamp may vary. When the real-time interval corresponding to the timestamp increases the likelihood of several write transactions being performed on the same record during a single timestamp interval increases. However the present invention is designed to cope with this possibility, so that the recovery is performed correctly even if a record has been updated twice within the same timestamp interval.

The old version that is used as a starting point in the inventive node recovery can be retrieved and stored in many different ways. What is important to the present invention is only that the old version is somehow possible to retrieve. It is for instance possible that the old version is retrieved from disc in the failed node or from a central disc in the system.

In addition to the variations described above many other variations of the present invention are possible as will be appreciated by a person skilled in the art.

In the example described above with reference to FIGS. 3-5 and table 1 it appeared as if a very large portion of the fragment F1 had changed during the node failure. However in reality fragments will generally be much larger than illustrated in FIG. 4 and FIG. 5 and it is likely that only a small portion of the total number of records has changed from the time the old version was saved until the recovery was started. With the present invention large parts of the fragment that has not changed during the node failure will not have to be copied. The amount of copying needed in node recovery according to the present invention is thus limited which makes the method suitable for recovery of very large fragments.

Compared to the known log method described above the present invention has the advantage that only a few log records need to be stored since only delete transactions are logged. As mentioned above the information that needs to be stored about a delete transaction is very small (<100 bytes) and there is therefore little risk for overflow in the delete log.

A further advantage of the present invention compared to the known log method described above is that write transactions do not have to be stopped during the node recovery.

The invention claimed is:

1. A method for node recovery of a first node in a system comprising a distributed database, which method involves recovering at least one first database fragment in the first node; which method includes the steps of retrieving an old version of the first database fragment to the first node, the old version of the first database fragment containing a plurality of records each individually marked with a first timestamp respectively;

making the old version of the first database fragment available to write transactions, which are requested in the system and which affect records of the first database fragment;

deleting records in the old version of the first database fragment based on information from a delete log, which delete log is a log that consists of information related to delete transactions;

scanning an up to date version of the first database fragment in a second node for records with first timestamps indicating a point in time later than or equal to a predetermined point in time; and copying only the records found in the scanning step that have timestamps indicating a point in time later than or equal to a predetermined point in time to the old version of the first database fragment, wherein said method steps bring the old version of the first database fragment up to date such that the first database fragment is recovered in the first node.

2. The method for node recovery according to claim 1, wherein the first timestamp indicates the time that the last write transaction was performed on the record.

3. The method for node recovery according to claim 1, wherein said predetermined point in time is equal to the latest point in time indicated by any first timestamp in the old version before the step of making the old version available to write transactions is performed.

4. The method for node recovery according to claim 1, wherein the delete log comprises a number of log records, which log records each include a second timestamp and a record identifier relating to a delete transaction that was performed on the first database fragment between a first point in time and a second point in time.

5. The method for node recovery according to claim 4, wherein the step of deleting records includes the further steps of, for each log record of the delete log, checking the second timestamp, if the second timestamp is indicating a point in time later than or equal to said predetermined point in time and earlier than the time for the start of node recovery, deleting a record in the old version with a record identifier equal to the record identifier of the log record if such a record exist, and otherwise ignoring the log record.

6. The method for node recovery according to claim 1, wherein the old version of the first database fragment is made available to write transactions such that all insert requests are performed on the old version, and such that a delete or an update request is performed on the old version if the old version includes a record with a record identifier equal to a record identifier of the delete or update request and otherwise is ignored.

7. The method for node recovery according to claim 1, wherein said copying is performed such that, if the old version includes a matching record, a copy of the record found in the scanning step overwrites the matching record and, if no matching record exist in the old version, the copy is inserted in the old version, which matching record has a record identifier equal to a record identifier of the copy.

8. The method for node recovery according to claim 1, wherein said delete log is located in a node separate from the first node and wherein the information from the delete log is communicated to the first node over a network interconnecting the first node and the node in which the delete log is located.

9. The method for node recovery according to claim 8, wherein the node in which the delete log is located is said second node.

10. The method for node recovery according to claim 1, wherein said delete log is located in a centralized management system of said system and wherein the information from the delete log is communicated to the first node over a network interconnecting the first node and the centralized management system.

11. A node for a system with a distributed database which node includes
   means for storing at least one first database fragment including a plurality of records,
   means for retrieving an old version of the first database fragment in connection with a recovery of the node after failure,
   means for marking each record of the first fragment individually with a first timestamp respectively,
   means for making the retrieved old version of the first database fragment available to write transactions, which are requested in the system and which affect records of the first database fragment,
   means for executing log records of a first delete log on the retrieved old version of the first database fragment, which delete log is a log that consists of information related to delete transactions,
   means for scanning the first database fragment for records with first timestamps indicating a point in time later than or equal to a predetermined point in time, and
   means for copying only records found in a scan that have timestamps indicating a point in time later than or equal to a predetermined point in time to another node.

12. The node according to claim 11, wherein the first timestamp is indicating the time that the last write transaction was performed on the record.

13. The node according to claim 11, wherein said predetermined point in time is equal to the latest point in time indicated by any first timestamp in the retrieved old version before the retrieved old version is made available to write transactions.

14. The node according to claim 11, wherein the first delete log comprises a number of log records, which log records each include a second timestamp and a record identifier relating to a delete transaction that was performed on the first database fragment between a first point in time and a second point in time.

15. The node according to claim 14, wherein the means for executing log records of the first delete log includes
   means for checking the second timestamp of each log record of the first delete log;
   means for selecting log records to be executed, which means for selecting are arranged to select a record if the second timestamp of the record is indicating a point in time later than or equal to said predetermined point in time and earlier than the time for the start of node recovery; and
   means for deleting a record in the retrieved old version with a record identifier equal to the record identifier of a selected log record if such a record exist in the retrieved old version.

16. The node according to claim 11, wherein the means for making the retrieved old version of the first database fragment available to write transactions is arranged to allow all insert requests to be performed on the retrieved old version, and to allow a delete or an update request to be performed on the retrieved old version if the retrieved old version includes a record with a record identifier equal to a record identifier of the delete or update request.

17. The node according to claim 11, wherein the node further includes a second delete log and means for storing information in the second delete log.

18. The node according to claim 17, wherein the information of the second delete log is stored in log records, wherein each log record includes a second timestamp and a record identifier relating to a delete transaction that was performed on the first database fragment between a third point in time and a fourth point in time.

19. The node according to claim 11, wherein said first delete log is located in another node with which the node is interconnected by means of a network.

20. The node according to claim 11, wherein said first delete log is located in a centralized management system with which the node is interconnected by means of a network.

* * * * *